Jan. 2, 1962   R. P. LICKLITER ETAL   3,015,375
LOCKING CONNECTION FOR SUPPORTING GRID SYSTEMS
Filed Aug. 24, 1959   2 Sheets-Sheet 2

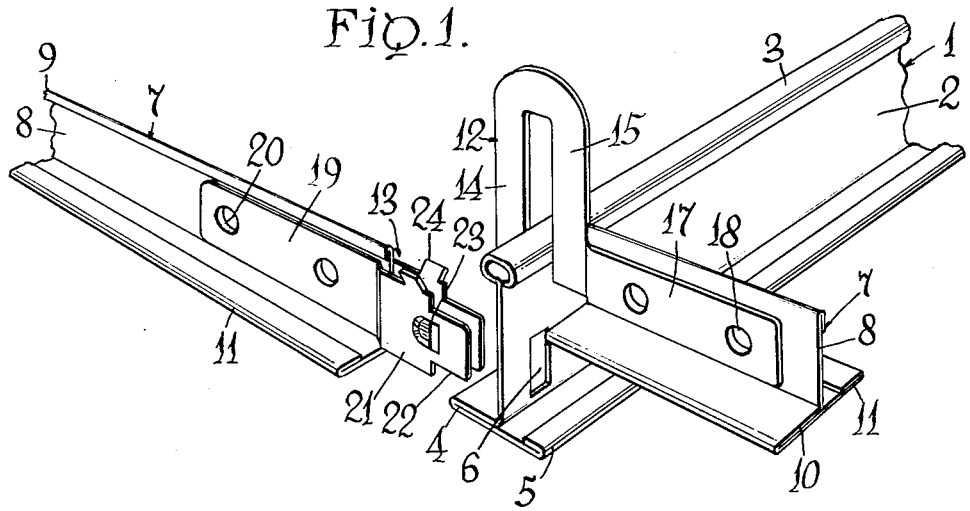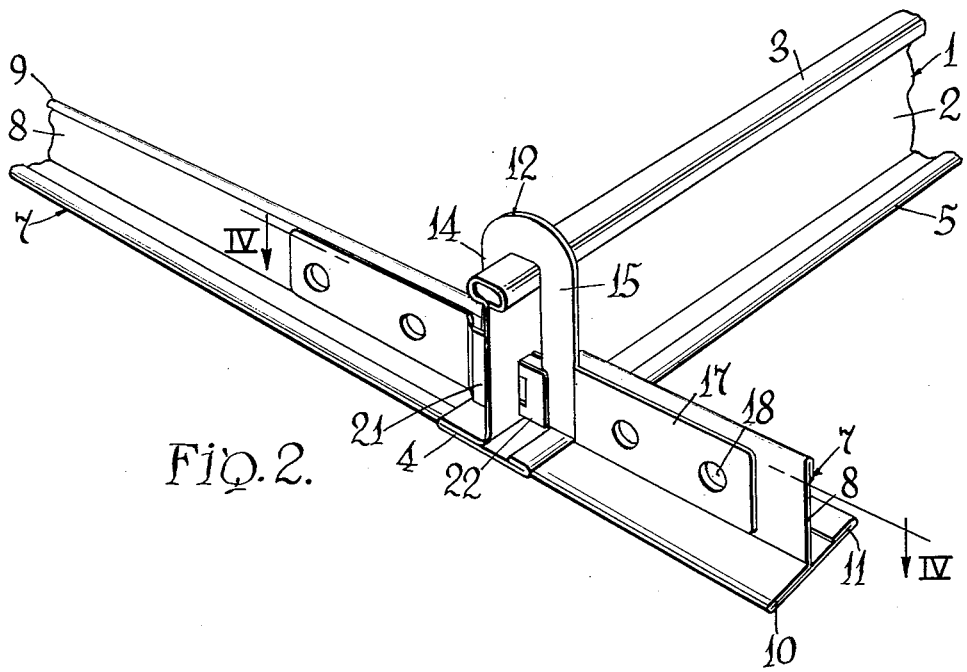

INVENTOR.
Robert P. Lickliter
BY & Earl Abbott

Beau, Brooks, Buckley & Beau.

United States Patent Office 3,015,375
Patented Jan. 2, 1962

3,015,375
LOCKING CONNECTION FOR SUPPORTING
GRID SYSTEMS
Robert P. Lickliter, 119 Buffalo St., and Earl Abbott,
62 Dudley Ave., both of Hamburg, N.Y.
Filed Aug. 24, 1959, Ser. No. 835,466
10 Claims. (Cl. 189—36)

This invention relates generally to a locking arrangement, and more particularly to a new and useful locking connection for supporting grid systems, such as those used in suspended accoustical ceilings, and the like.

A primary objective of this invention is to provide a positive locking connection of a type which is easily and quickly installed by a simple hand operation requiring no tools.

Another object of this invention is to provide the foregoing in a locking connection device characterized by its simplicity, being composed of very few parts which are easily and relatively inexpensively fabricated.

Still another object of this invention is to provide a locking connection of this character which can be readily disconnected and replaced, at any time, without damage.

An additional object of this invention is to provide a locking connection having the foregoing characteristics and which lends strength to the supporting members and maintains the desired angular relation therebetween while permitting a variety of system pattern designs.

In one aspect thereof, a locking device constructed in accord with this invention is characterized by the provision of a first support member having a slot therein, with a pair of second support members extending transversely of the first support member on opposite sides thereof, one of the second support members having a locking hook portion extending across the first support member and terminating in a depending leg near the slot, and the other second support member having a locking portion engaging the depending leg on opposite sides thereof and extending into the slot when the two locking portions are engaged.

The foregoing and other objects, advantages and characterizing features of this invention will become clearly apparent from the ensuing detailed description of a presently preferred embodiment thereof, taken in conjunction with the accompanying drawing wherein like reference numerals denote like parts and wherein:

FIG. 1 is a fragmentary perspective view of a supporting grid system, showing the locking connection device of this invention in unlocked position;

FIG. 2 is a similar view, but showing the same in locked position,

Figure 3:
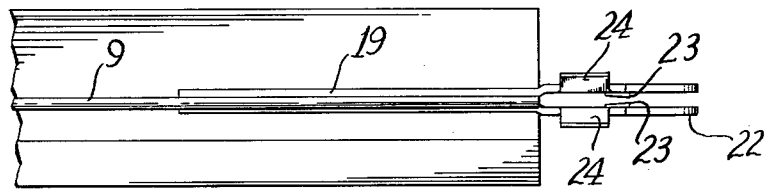
FIG. 3 is a somewhat enlarged, fragmentary, top plan view of one of the cross T's, showing its locking part.
Figure 4:
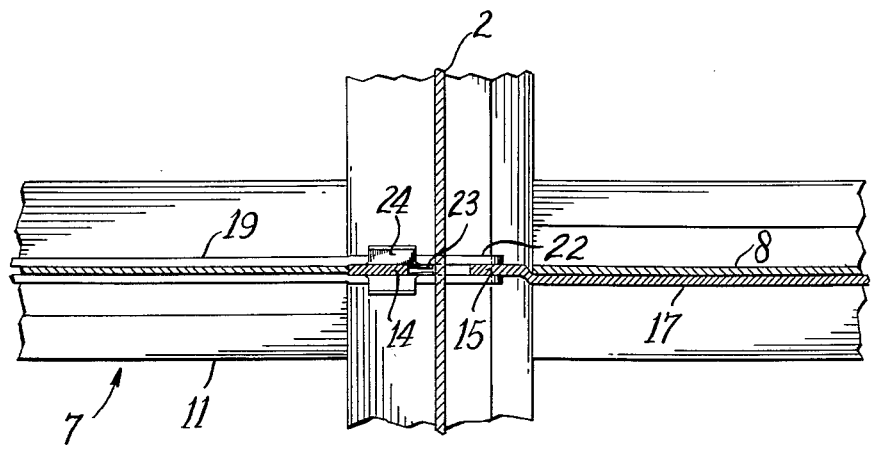
FIG. 4 is a correspondingly enlarged fragmentary sectional view of the assembled device, taken about on line IV—IV of FIG. 2.

While not necessarily limited thereto, the locking device connection of this invention is particularly adapted for use in exposed suspended grid systems of the type comprising, for example, support members in the form of main T's, cross T's extending at right angles thereto, and bridging T's parallel to the main T's and extending between the cross T's at right angles thereto. Such an arrangement is generally illustrated in the accompanying drawing, wherein there is shown a first support member in the form of a main T generally designated 1, conveniently fabricated from a single piece of material to comprise a normally vertical web portion 2 surmounted by a longitudinally extending reinforcing rim 3 of box section, and having along its bottom edge lateral flanges 4 and 5 on opposite sides thereof. As part of the locking connection of this invention the main T 1 is provided with a slot in its web portion 2, adjacent the intersection with the cross T members, as indicated at 6. The main T 1 intersects a pair of second support members comprising cross T's, generally designated 7, and each similarly fabricated to have a vertical web portion 8 surmounted by a reinforcing flange 9 and having adjacent its bottom edge lateral flanges 10 and 11 on opposite sides thereof.

It will be appreciated that, apart from the slot 6, the main and cross T's 1 and 7 are of conventional construction, designed to define rectangular areas for receiving acoustical tiles and the like to be supported by the flanges 4, 5, 10 and 11.

The locking connection device of this invention comprises a pair of locking parts, generally designated 12 and 13, with part 12 being carried by one of the cross T's 7, and part 13 being carried by the other cross T 7. Locking part 12 is in the form of a hook, of inverted, generally U-shape having a pair of depending leg portions 14 and 15 and extending across the web 2 with the legs 14 and 15 bearing on the main T flanges 4 and 5, respectively, adjacent slot 6. The leg 15 has a lateral extension 17 which is riveted or otherwise secured to the web 8 of the associated cross T 7, as indicated at 18, whereby locking part 12 comprises a locking hook portion extending from that cross T.

The other locking part 13 comprises paired locking members, on opposite sides of the associated cross T 7, each having a longitudinal extension 19 riveted or otherwise secured to web 8, and to each other, as indicated at 20. At the end of the associated cross T 7 the members 19 are offset, to provide laterally spaced apart extensions 21 adapted to bear on the main T flange 4 and terminating in longitudinally extending tongues 22 of reduced height for insertion through the slot 6, as illustrated in FIG. 2.

When installing the grid the cross T 7 carrying the lock parts 13 is interlocked with the main T 1, by inserting the tongue 22 of the lock part 13 through slot 6. Thereafter, the legs 14 and 15 of the lock part 12 are slip-fitted downwardly between the offset portions 21, 22 of the lock part 13. The parts 21, 22 are spaced apart a distance such that the legs 14 and 15 are readily and easily inserted therebetween, but with a slightly snug fit, so that the parts snap together and tightly engage in the manner illustrated in FIG. 2.

With the grid and locking parts thus assembled, it will be seen that the lock part 12 supports its associated cross T 7 on the main T 1, by the legs 14, 15 bearing on the flanges 4 and 5. The lock part 13, bearing against the bottom of the slot 6 and against the flange 4, supports its associated cross T 7 on the main T 1. In addition, the offset portions 21 and 22 of the lock part 13 snugly embrace the legs 14 and 15, respectively, of lock part 12 and thereby prevent movement of lock part 12 and its associated cross T 7 lengthwise of the main T 1. The other cross T 7 is held against movement lengthwise of main T 1 by engagement of lock part 13 in slot 6.

To prevent undesired disassembly, the lock part 13 is provided with a stop in the form of cooperating shoulders 23 pressed in one from each portion 21. The leg portion 14 of lock part 12 is inserted between portions 21 at a point between the cooperating shoulders 23 and the adjacent end of the associated cross T 7. The main T web 2 confines the tongues 22 within the slot 6 against lateral spreading apart, to prevent leg 14 from passing between shoulders 23. As a result, the cross T 7 carrying lock part 13 can not be shifted longitudinally to withdraw lock part 13 from slot 6 until such time as the lock part 12 has been lifted vertically, to the position illustrated in FIG. 1, to free the lock part 13. At the same time, shoulders 23 preclude longitudinal shifting of the cross T 7 carrying lock part 12.

Accordingly, it is seen that the locking connection of my invention is readily connected and disconnected, without the use of any tools whatever, and to facilitate insertion of the leg 14 between the lock portions 21 I provide the upper edges of the latter with outwardly flaring tongues 24 acting as cam surfaces, to guide the leg 14. In addition, the cross T's and locking parts are carefully fabricated, so that the lateral flanges 10, 11 of the cross T's 7 abut the lateral flanegs 4, 5 of the main T 1 when the locking parts are engaged. This further strengthens the connection, by precluding lateral twisting of the cross T's, and prevents longitudinal shifting of the interlocked cross T's.

It will be observed that the lock part 12 has a depth sufficient to extend around the web 2 of the main T 1. In addition, it will readily accommodate bridging T's, not illustrated, which are identical with cross T's 7 and have a web of lesser height than web 2. It will be observed that sharp corners are provided in the rectangular areas defined by the interconnected cross and main T's, to smoothly receive the tiles to be supported thereby.

Accordingly, it is seen that my invention fully accomplishes its intended objects, and provides a locking connection which is readily assembled and disassembled, while providing a positive, rigid locking connection between the associated support shoulders. After the grid system is installed, the cross T's can be disconnected and subsequently reconnected at any time, without damage to the locking connection and without requiring any particular skill on the part of the person doing such work.

It will be appreciated that the foregoing detailed disclosure is intended to be illustrative only, without thought of limitation, and that variations therein and modifications thereof can be made without departing from the spirit of our invention and the scope of the appended claims.

Having fully disclosed and completely described our invention, what we claim as new is:

1. A locking device for supporting grid systems and the like comprising, in combination with a first support member having a web portion and lateral flanges on opposite sides thereof, said web portion having a slot therein, a pair of second support members extending transversely of said first support member on opposite sides thereof, one of said second support members having a locking portion of inverted generally U-shape receiving said web portion of said first support member and having opposite side leg portions bearing at their lower ends against said lateral flanges of said first support member, and the other of said second support members having a locking portion extending through said slot and engaging each of said side leg portions on opposite sides thereof.

2. A locking device for supporting grid systems and the like comprising, in combination, a first support member having a web portion and lateral flanges on opposite sides thereof, said web portion having a slot therein, and a pair of second support members extending transversely of said first support member on opposite sides thereof adjacent said slot, one of said second support members having a locking portion of inverted generally U-shape extending over said web portion of said first member and having opposite side leg portions bearing at their lower end on said lateral flanges for supporting said one second support member, the other of said second support members having a locking portion extending through said slot and receiving said opposite side leg portions in slip-fitting relation therewith for restraining said one second support member against movement lengthwise of said first support member, said other locking portion bearing on said first support member for supporting said other second support member and being laterally confined in said slot for restraining said other second support member against movement lengthwise of said first support member.

3. A locking device for supporting grid systems and the like comprising, in combination with a first support member and a pair of second support members extending transversely of said first support member on opposite sides thereof, each of said support members having a web portion and lateral flange portions on opposite sides thereof and said first support member having a slot in the web thereof, said first support member intersecting said second support members adjacent said slot with said lateral flanges of one of said second support members lying in substantially the same plane as the lateral flange on one side of said first support member and abutting the same and with said lateral flanges of the other of said second support members lying in substantially the same plane as the lateral flange on the other side of said first support member and abutting the same, one locking member of inverted generally U-shape extending from said one second support member around said first support member web portion and having opposite side legs bearing on said first support member flanges, and another locking member extending from said other second support member through said slot, said other locking member laterally confining the side leg of said one locking member on the side of said first support member remote from said one second support member.

4. A locking device for supporting grid systems and the like comprising, in combination, a first support member having a web portion and a slot therein, and a pair of second support members extending transversely of said first support member on opposite sides thereof, one of said second support members having a locking hook portion extending across said first support member web portion and terminating in a depending side leg portion adjacent said slot, and the other of said second support members having a locking portion engaging said depending side leg portion on opposite sides thereof transversely of said second support members and extending into said slot when said locking portions are engaged.

5. A locking device as defined in claim 4, wherein said second support member locking portion has a stop shoulder between said web portion and said depending side leg portion engaging the latter and precluding withdrawal of said second support member locking portion from said slot when said locking portions are engaged.

6. A locking device for supporting grid systems and the like comprising, in combination, a first support member having a web portion and a slot therein, and a pair of second support members extending transversely of said first support member on opposite sides thereof, one of said second support members having a locking hook portion extending across said first support member web portion and terminating in a depending leg portion adjacent said slot, and the other of said second support members having a locking portion comprising paired members spaced apart to receive said depending leg portion therebetween and extending from said other second support member into said slot, said paired locking members having cooperating shoulders interposed between said depending leg portion and said web portion and precluding withdrawal of said paired locking members from said slot when said depending leg portion is between said paired locking members, said paired locking members being confined in said slot by said web portion against lateral spreading apart, such as might otherwise permit passage of said depending leg portion between said shoulders.

7. A locking device as set forth in claim 6, wherein the upper edges of said paired locking members are flared to facilitate insertion of said depending leg portion therebetween.

8. A locking device for supporting grid systems and the like comprising, a first support member having a web portion with a slot therein and a lateral flange on one side thereof, a pair of second support members extending transversely of said first support member on opposite sides thereof, one of said second support members having a locking hook portion extending therefrom across said web portion and terminating in a depending leg portion bearing at its lower end on said lateral flange, and the other of said second support members having a locking portion engaging said depending leg portion on opposite sides thereof and extending into said slot.

9. A locking device as set forth in claim 8, wherein said other second support member locking portion comprises paired locking members spaced apart and receiving said depending leg portion therebetween, said paired locking members having cooperating shoulders positioned between said depending leg portion and said slot and precluding withdrawal of said paired locking members from said slot when said depending leg portion is between said pair locking members, said paired locking members being confined in said slot by said web portion against lateral spreading apart such as might permit said depending leg portion to pass between said cooperating shoulders.

10. A locking device as set forth in claim 9, wherein said locking hook portion is of inverted generally U-shape having depending leg portions on opposite sides of said web portion, said paired locking members extending through said slot and on opposite sides of both said leg portions.

References Cited in the file of this patent

FOREIGN PATENTS

| 46,128 | Switzerland | Nov. 4, 1908 |
| 347,857 | Germany | Jan. 26, 1922 |